United States Patent
Teo (10) Patent No.: US 9,519,436 B1
(45) Date of Patent: Dec. 13, 2016

(54) MEMORY ERASING METHOD, MEMORY CONTROLLER, AND MEMORY STORAGE APPARATUS

(71) Applicant: PHISON ELECTRONICS CORP., Miaoli (TW)

(72) Inventor: Wei-Chen Teo, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 15/229,125

(22) Filed: Aug. 5, 2016

Related U.S. Application Data (62) Division of application No. 13/213,107, filed on Aug. 19, 2011, now Pat. No. 9,460,004.

(30) Foreign Application Priority Data

Jun. 15, 2011 (TW) .............................. 100120949 A (51) Int. Cl.
*G06F 3/06* (2006.01)

(52) U.S. Cl.
CPC ........... *G06F 3/0625* (2013.01); *G06F 3/0652* (2013.01); *G06F 3/0659* (2013.01); *G06F 3/0688* (2013.01)

(58) Field of Classification Search
CPC .................................................. G06F 12/0246
See application file for complete search history.

*Primary Examiner* — Gary W Cygiel
(74) *Attorney, Agent, or Firm* — Jianq Chyun IP Office (57) ABSTRACT

A memory erasing method and a memory controller and a memory storage apparatus using the same are provided. The method comprising establishing a link list according to a plurality of physical blocks of a spare area, and storing the link list into the rewritable non-volatile memory module, wherein the physical blocks of the spare area are recorded in the link list according to an arrangement order; and during every power on of the memory storage apparatus, selecting a plurality of third physical blocks among the physical blocks in the spare area according to the link list and a predetermined number, and respectively executing an erase command on the third physical blocks, wherein the third physical blocks are arranged at a beginning of the link list, and the number of the third physical blocks is the predetermined number.

9 Claims, 10 Drawing Sheets

| Physical block | Erase mark |
|---|---|
| 410(F) | 1 |
| 410(F+1) | 0 |
| ⋮ | ⋮ |
| 410(S-1) | 0 |

MEMORY ERASING METHOD, MEMORY CONTROLLER, AND MEMORY STORAGE APPARATUS

CROSS-REFERENCE TO RELATED APPLICATION

This application is a divisional application of and claims the priority benefit of U.S. non-provisional application Ser. No. 13/213,107, filed on Aug. 19, 2011, now allowed, which claims the priority benefit of Taiwan application serial no. 100120949, filed on Jun. 15, 2011. The entirety of each of the above-mentioned patent applications is hereby incorporated by reference herein and made a part of this specification.

BACKGROUND

1. Technology Field

The present invention generally relates to a memory erasing method, and more particularly, to a memory erasing method which can effectively execute an erase command on memory cells storing invalid data, and a memory controller and a memory storage apparatus using the same.

2. Description of Related Art

Along with the widespread of digital cameras, cell phones, and MP3 in recently years, the consumers' demand to storage media has increased drastically. Rewritable non-volatile memory is one of the most adaptable storage media to portable electronic products (for example, notebook computers) due to its many characteristics such as data non-volatility, low power consumption, small volume, non-mechanical structure, and high access speed. A solid state drive (SSD) is a storage apparatus which uses a flash memory as its storage medium. Thus, in recent years, the flash memory industry has become a major part of the electronic industry.

A sub memory module of a rewritable non-volatile memory module has a plurality of physical blocks, and each of the physical blocks has a plurality of physical pages. While writing data into a physical block, the data has to be written according to the sequence of the physical pages. Besides, a physical page already containing data should be erased before it is used for writing new data. In particular, each physical block is the smallest unit for erasing data, and each physical page is the smallest unit for programming (i.e., writing) data. In the management of a flash memory module, physical blocks are grouped into a data area and a spare area.

Physical blocks (also referred to as data physical blocks) in the data area are physical blocks already containing data and mapped to logical blocks. To be specific, a memory management circuit of a memory storage apparatus converts a logical access address to be accessed by a host system into a logical page of a logical block, writes the data to be written into a physical page of a specific physical block, and maps the logical page of the logical block to the physical page of the physical block. Namely, in the management of a rewritable non-volatile memory module, the physical blocks in the data area are considered used physical blocks (for example, already containing data written by a host system). For example, the memory management circuit records the mapping relationship between the logical blocks and the physical blocks in the data area in a logical block-physical block mapping table, wherein the logical pages in a logical block are sequentially mapped to the physical pages in the corresponding physical block.

Physical blocks (also referred to as spare physical blocks) in the spare area are used for substituting the physical blocks in the data area. To be specific, as described above, a physical block already containing data has to be erased before it can be used for writing new data. Thus, the physical blocks in the spare area are used for writing update data and substituting the physical blocks originally mapped to logical blocks.

Namely, in the management of a rewritable non-volatile memory module, the physical pages of the physical blocks in the data area and the spare area are alternatively mapped to the logical pages of the logical blocks for storing data written by a host system. In particular, during the operation of a memory storage apparatus, a writing operation may be aborted due to a power failure, and accordingly incomplete data may be stored in a physical block in the spare area. Thus, in an existing design, when the memory storage apparatus is powered on, a memory controller of the memory storage apparatus executes an erase command on the physical blocks in the spare area to ensure that the physical blocks in the spare area have all been erased, so as to avoid double programming.

However, along with the increase in the capacity of rewritable non-volatile memory module, it takes a very long time to execute the erase command on all the physical blocks in the spare area. Thus, after powering on a memory storage apparatus, a user has to wait for a very long time before the user can access the memory storage apparatus.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a memory erasing method and a memory controller, in which the time for a memory storage apparatus to enter a standby state after the memory storage apparatus is powered on can be effectively shortened.

The present invention is directed to a memory storage apparatus which can instantly enter a standby state after being powered on.

According to an exemplary embodiment of the present invention, a memory erasing method for a rewritable non-volatile memory module of a memory storage apparatus is provided, wherein the rewritable non-volatile memory module has a plurality of physical blocks. The memory erasing method includes following steps. The physical blocks are logically grouped into at least a data area and a spare area. After the memory storage apparatus is powered on, an erase mark is configured for each of the physical blocks in the spare area, and initially each of the erase marks is set to an unerased state.

According to an exemplary embodiment of the present invention, a memory erasing method for a rewritable non-volatile memory module of a memory storage apparatus is provided, wherein the rewritable non-volatile memory module has a plurality of physical blocks. The memory erasing method includes following steps. The physical blocks are logically grouped into at least a data area and a spare area. A link list is established according to the physical blocks in the spare area, and the link list is stored into the rewritable non-volatile memory module, wherein the physical blocks in the spare area are recorded in the link list according to an arrangement order. After the memory storage apparatus is powered on, a plurality of third physical blocks is selected among the physical blocks in the spare area according to the link list and a predetermined number, and an erase command is respectively executed on the third physical blocks, wherein the third physical blocks are arranged at the beginning of the link list, and the number of the third physical blocks is the predetermined number.

According to an exemplary embodiment of the present invention, a memory controller for controlling a rewritable non-volatile memory module is provided, wherein the rewritable non-volatile memory module has a plurality of physical blocks. The memory controller includes a host interface, a memory interface, and a memory management circuit. The host interface is configured to couple to a host system. The memory interface is configured to couple to the rewritable non-volatile memory module. The memory management circuit is coupled to the host interface and the memory interface and logically groups the physical blocks into at least a data area and a spare area. After the memory management circuit is powered on, the memory management circuit configures an erase mark for each of the physical blocks in the spare area and initially sets each of the erase marks to an unerased state.

According to an exemplary embodiment of the present invention, a memory controller for controlling a rewritable non-volatile memory module is provided, wherein the rewritable non-volatile memory module has a plurality of physical blocks. The memory controller includes a host interface, a memory interface, and a memory management circuit. The host interface is configured to couple to a host system. The memory interface is configured to couple to the rewritable non-volatile memory module. The memory management circuit is coupled to the host interface and the memory interface and logically groups the physical blocks into at least a data area and a spare area. The memory management circuit establishes a link list according to the physical blocks in the spare area and stores the link list into the rewritable non-volatile memory module, wherein the physical blocks in the spare area are recorded in the link list according to an arrangement order. After the memory management circuit is powered on, the memory management circuit selects a plurality of third physical blocks among the physical blocks in the spare area according to the link list and a predetermined number and respectively executes an erase command on the third physical blocks, wherein the third physical blocks are arranged at the beginning of the link list, and the number of the third physical blocks is the predetermined number.

According to an exemplary embodiment of the present invention, a memory storage apparatus including a connector, a rewritable non-volatile memory module, and a memory controller is provided. The connector is configured to couple to a host system. The rewritable non-volatile memory module has a plurality of physical blocks. The memory controller is coupled to the rewritable non-volatile memory module and logically groups the physical blocks into at least a data area and a spare area. After the memory controller is powered on, the memory controller configures an erase mark for each of the physical blocks in the spare area and initially sets each of the erase marks to an unerased state.

According to an exemplary embodiment of the present invention, a memory storage apparatus including a connector, a rewritable non-volatile memory module, and a memory controller is provided. The connector is configured to couple to a host system. The rewritable non-volatile memory module has a plurality of physical blocks. The memory controller is coupled to the rewritable non-volatile memory module and logically groups the physical blocks into at least a data area and a spare area. The memory controller establishes a link list according to the physical blocks in the spare area and stores the link list into the rewritable non-volatile memory module, wherein the physical blocks in the spare area are recorded in the link list according to an arrangement order. After the memory controller is powered on, the memory controller selects a plurality of third physical blocks among the physical blocks in the spare area according to the link list and a predetermined number and respectively executes an erase command on the third physical blocks, wherein the third physical blocks are arranged at the beginning of the link list, and the number of the third physical blocks is the predetermined number.

As described above, the memory erasing method, the memory controller and the memory storage apparatus according to the exemplary embodiments of the present invention can effectively shorten the time for the memory storage apparatus to enter a standby state after the memory storage apparatus is powered on and thereby double programming can be effectively avoided.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In a memory erasing method disclosed by the present invention, when a memory storage apparatus is powered on, the memory storage apparatus is allowed to enter a standby state after the physical blocks in a spare area are marked or an erase command is executed on a part of the physical blocks in the spare area. Thereby, bootup of the memory storage apparatus won't be delayed by executing the erase command on too many physical blocks.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

A memory storage apparatus (i.e., memory storage system) usually includes a rewritable non-volatile memory module and a controller (i.e., control circuit). The memory storage apparatus is usually used with a host system so that the host system can write data into or read data from the memory storage apparatus.

Figure 1A:
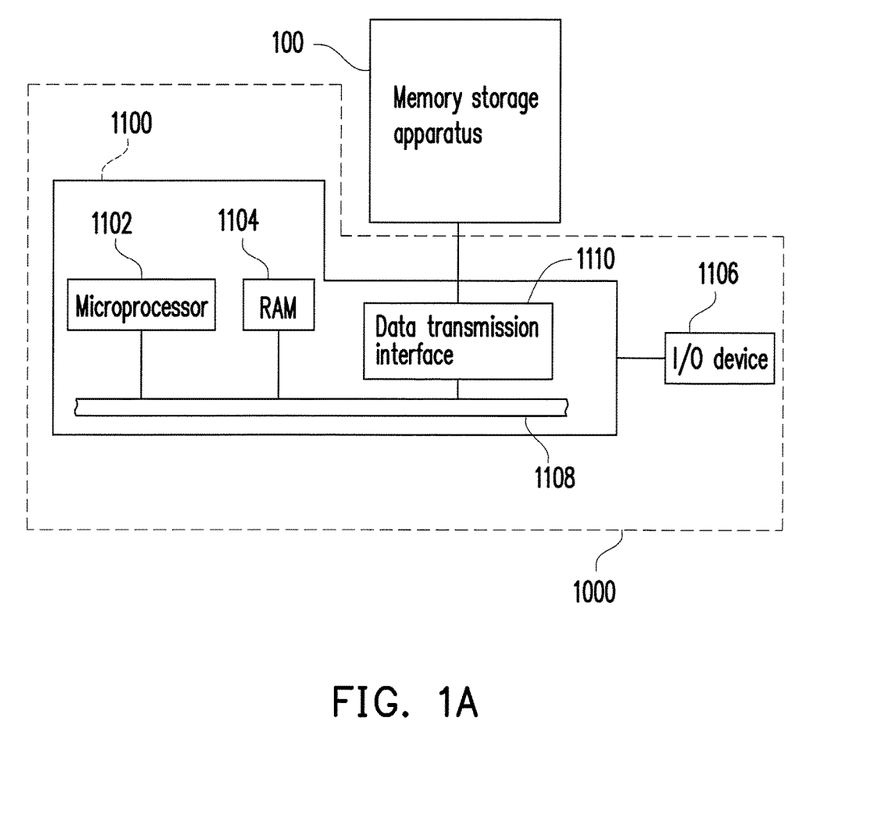
FIG. 1A illustrates a host system and a memory storage apparatus according to a first exemplary embodiment of the present invention.

FIG. 1A illustrates a host system and a memory storage apparatus according to the first exemplary embodiment of the present invention.

Figure 1B:
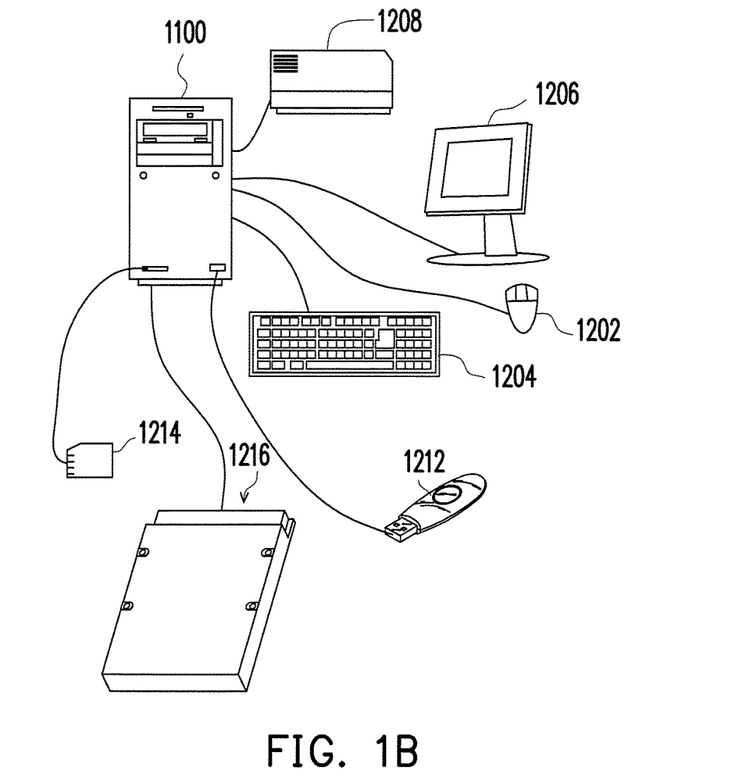
FIG. 1B is a diagram of a computer, an input/output (I/O) device, and a memory storage apparatus according to an exemplary embodiment of the present invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. However, the I/O device 1106 is not limited to the devices illustrated in FIG. 1B and may further include other devices.

In the present embodiment, the memory storage apparatus 100 is coupled to other components of the host system 1000 through the data transmission interface 1110. Data can be written into or read from the memory storage apparatus 100 through the operations of the microprocessor 1102, the RAM 1104, and the I/O device 1106. The memory storage apparatus 100 may be a rewritable non-volatile memory storage apparatus, such as the flash drive 1212, the memory card 1214, or the solid state drive (SSD) 1216 illustrated in FIG. 1B.

Figure 1C:
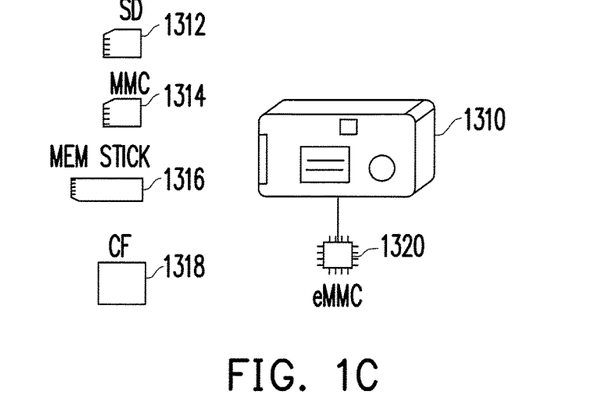
FIG. 1C is a diagram of a host system and a memory storage apparatus according to another exemplary embodiment of the present invention.

Generally, the host system 1000 may be substantially any system which can work with the memory storage apparatus 100 to store data. Even though the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage apparatus is then a secure digital (SD) card 1312, a multi media card (MMC) card 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that the eMMC is directly coupled to the motherboard of the host system.

Figure 2:
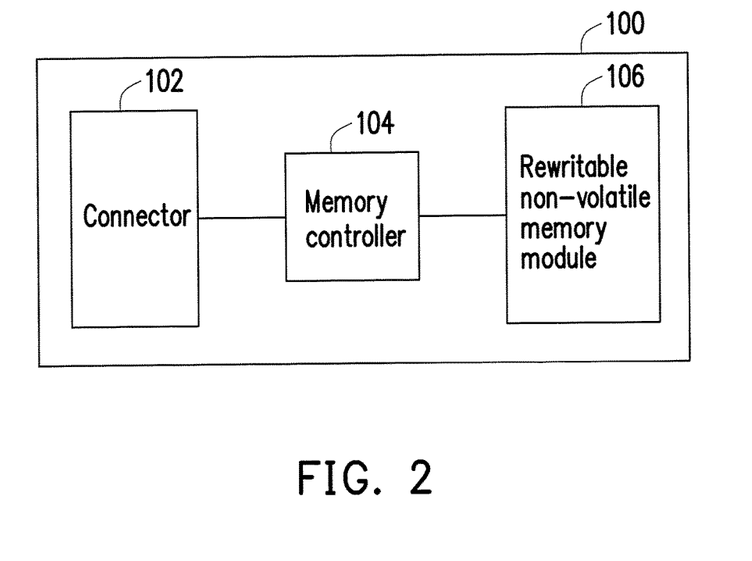
FIG. 2 is a schematic block diagram of a memory storage apparatus according to the first exemplary embodiment of the present invention.

FIG. 2 is a schematic block diagram of a memory storage apparatus according to the first exemplary embodiment of the present invention.

Referring to FIG. 2, the memory storage apparatus 100 includes a connector 102, a memory controller 104, and a rewritable non-volatile memory module 106.

In the present exemplary embodiment, the connector 102 complies with the serial advanced technology attachment (SATA) standard. However, the invention is not limited thereto, and the connector 102 may also comply with the Institute of Electrical and Electronic Engineers (IEEE) 1394 standard, the peripheral component interconnect (PCI) express standard, the parallel advanced technology attachment (PATA) standard, the universal serial bus (USB) standard, the SD interface standard, the MS interface standard, the MMC interface standard, the CF interface standard, the integrated device electronics (IDE) standard, or any other suitable standard.

The memory controller 104 executes a plurality of logic gates or control instructions implemented in a hardware form or a firmware form and performs various data operations on the rewritable non-volatile memory module 106 according to commands issued by the host system 1000.

The rewritable non-volatile memory module 106 is coupled to the memory controller 104 and has a plurality of physical blocks for storing data written by the host system 1000. In the present exemplary embodiment, each physical block has a plurality of physical pages. The physical pages belonging to the same physical block can be individually written but have to be erased all together. For example, each physical block is composed of 128 physical pages, and each physical page has a capacity of 4 kilobytes (KB). However, the present invention is not limited thereto, and each physical block may also be composed of 64, 256, or any other number of physical pages.

To be specific, each physical block is the smallest unit for erasing data. Namely, each physical block contains the least number of memory cells that are erased together. Each physical page is the smallest unit for programming data (i.e., physical page is the smallest unit for writing data). However, in another exemplary embodiment of the invention, the smallest unit for writing data may also be physical sector or some other units. Each physical page usually includes a data bit area and a redundancy bit area. The data bit area is used for storing user data, while the redundancy bit area is used for storing system data (for example, error checking and correcting (ECC) codes).

In the present exemplary embodiment, the rewritable non-volatile memory module 106 is a multi level cell (MLC) NAND flash memory module. However, the invention is not limited thereto, and the rewritable non-volatile memory module 106 may also be a single level cell (SLC) NAND flash memory module, any other flash memory module, or any other memory module having the same characteristics.

Figure 3:
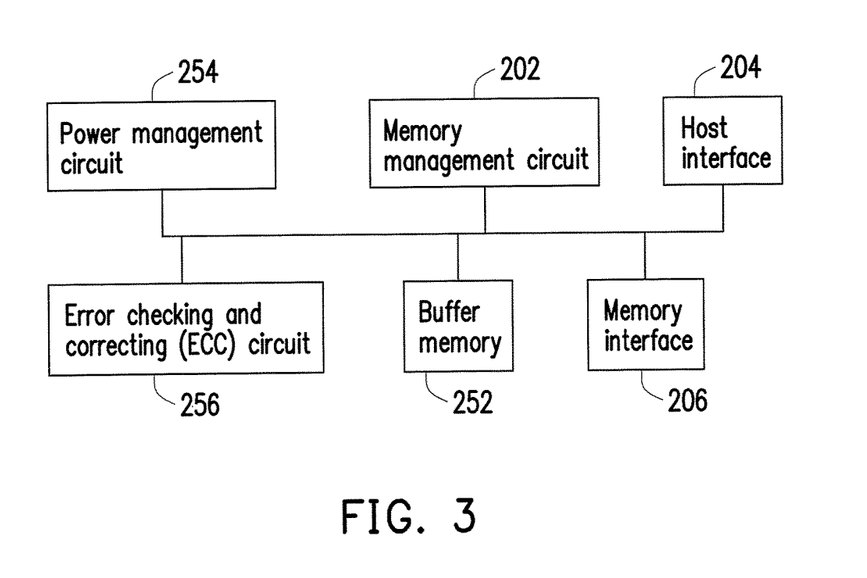
FIG. 3 is a schematic block diagram of a memory controller according to the first exemplary embodiment of the present invention.

FIG. 3 is a schematic block diagram of a memory controller according to the first exemplary embodiment of the present invention.

Referring to FIG. 3, the memory controller 104 includes a memory management circuit 202, a host interface 204, and a memory interface 206.

The memory management circuit 202 controls the overall operation of the memory controller 104. To be specific, the memory management circuit 202 has a plurality of control instructions, and when the memory storage apparatus 100 is in operation, the control instructions are executed to perform various data operations on the rewritable non-volatile memory module 106.

In the present exemplary embodiment, the control instructions of the memory management circuit 202 are implemented in a firmware form. For example, the memory management circuit 202 has a microprocessor unit (not shown) and a read-only memory (ROM, not shown), and these control instructions are burnt into the ROM. When the memory storage apparatus 100 is in operation, the control instructions are executed by the microprocessor unit to perform various data operations.

In another exemplary embodiment of the present invention, the control instructions of the memory management circuit 202 may also be stored in a specific area of the rewritable non-volatile memory module 106 (for example, the system area exclusively used for storing system data in a memory module) as program codes. In addition, the memory management circuit 202 has a microprocessor unit (not shown), a ROM (not shown), and a RAM (not shown). Particularly, the ROM has a boot code, and when the memory controller 104 is enabled, the microprocessor unit first executes the boot code to load the control instructions from the rewritable non-volatile memory module 106 into the RAM of the memory management circuit 202. After that, the microprocessor unit runs these control instructions to perform various data operations. Additionally, in yet another exemplary embodiment of the invention, the control instructions of the memory management circuit 202 may also be implemented in a hardware form.

The host interface 204 is coupled to the memory management circuit 202 and configured to receive and identify commands and data sent by the host system 1000. Namely, commands and data sent by the host system 1000 are transmitted to the memory management circuit 202 via the host interface 204. In the present exemplary embodiment, the host interface 204 complies with the SATA standard. However, the present invention is not limited thereto, and the host interface 204 may also comply with the PATA standard, the IEEE 1394 standard, the PCI express standard, the USB standard, the SD standard, the MS standard, the MMC standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

Additionally, the memory controller 104 may further includes a buffer memory 252, a power management circuit 254 and an ECC circuit 256.

The buffer memory 252 is coupled to the memory management circuit 202 and configured to temporarily store data and commands from the host system 1000 or data from the rewritable non-volatile memory module 106.

The power management circuit 254 is coupled to the memory management circuit 202 and configured to control the power supply of the memory storage apparatus 100.

The ECC circuit 256 is coupled to the memory management circuit 202 and configured to execute an ECC procedure to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 256 executes the ECC procedure on the data according to the ECC code.

Figure 4A:
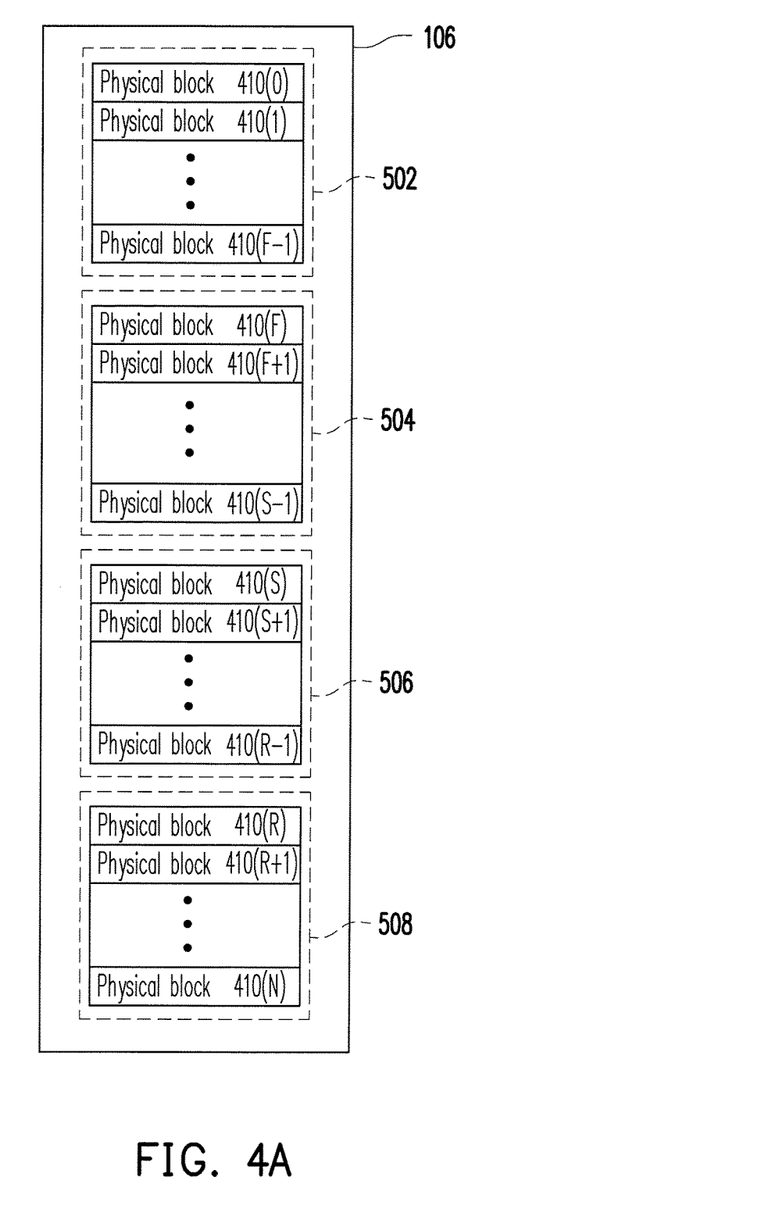
FIG. 4A and FIG. 4B are diagrams illustrating how physical blocks of a rewritable non-volatile memory module are managed according to the first exemplary embodiment of the present invention.
Figure 4B:
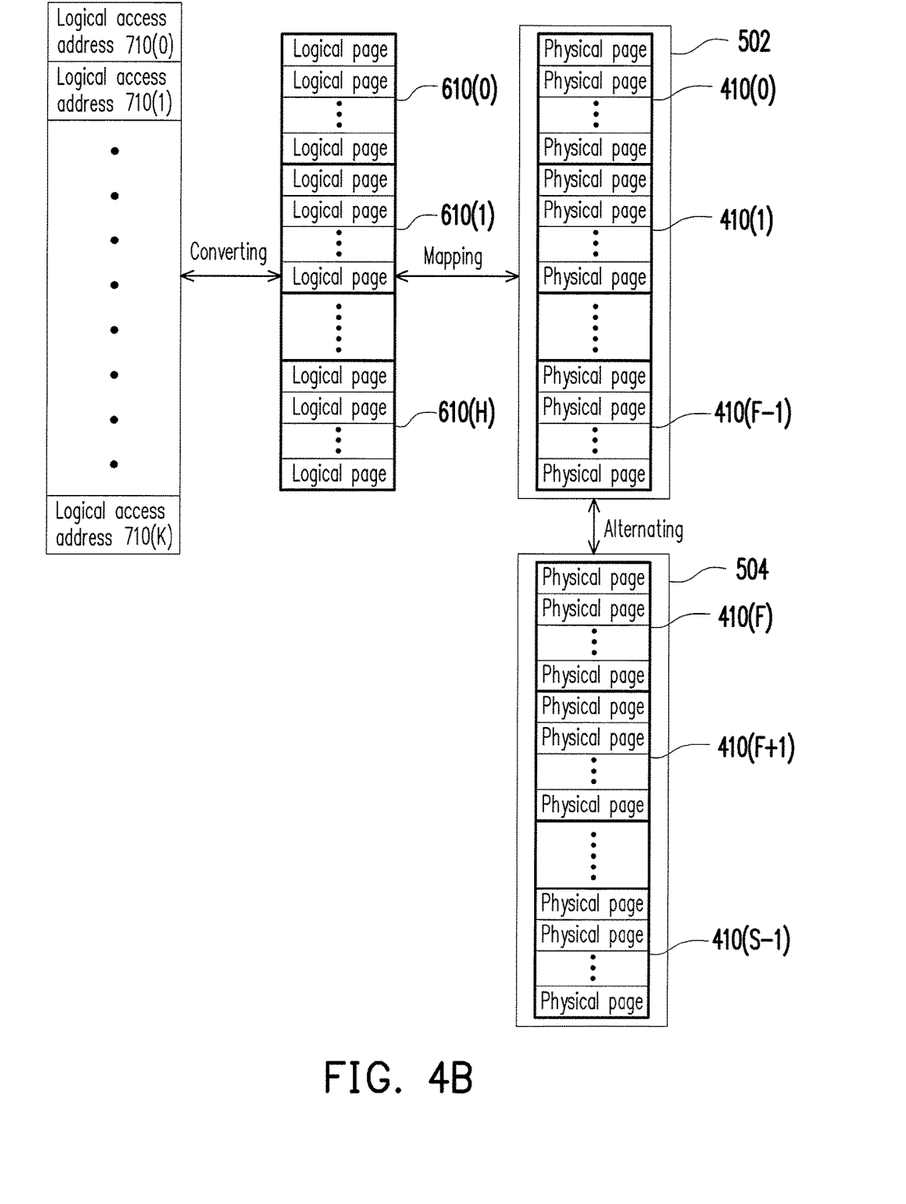

FIG. 4A and FIG. 4B are diagrams illustrating how physical blocks of a rewritable non-volatile memory module are managed according to the first exemplary embodiment of the present invention.

Referring to FIG. 4A, the rewritable non-volatile memory module 106 has physical blocks 410(0)-410(N), and the memory management circuit 202 of the memory controller 104 logically groups the physical blocks 410(0)-410(N) into a data area 502, a spare area 504, a system area 506, and a replacement area 508.

Physical blocks logically belonging to the data area 502 and the spare area 504 are used for storing data from the host system 1000. To be specific, physical blocks (also referred to as data physical blocks) in the data area 502 are considered physical blocks containing data, while physical blocks (also referred to as spare physical blocks) in the spare area 504 are physical blocks used for writing new data. For example, when a write command and data to be written are received from the host system 1000, the memory management circuit 202 selects a physical block from the spare area 504 as a child physical block and writes the data into the child physical block. In another example, when executing a data merging procedure on a specific logical block, the memory management circuit 202 selects a physical block from the spare area 504 as a new data physical block corresponding to the logical block for writing the data and substitutes the original data physical block mapped to the logical block with this new data physical block. In particular, after a data merging procedure is completed, original data physical blocks or child physical blocks containing invalid data are associated (or recycled) to the spare area 504 so that later on they can be used for writing new data.

Physical blocks logically belonging to the system area 506 are used for recording system data, such as the manufacturer and model of the rewritable non-volatile memory module, the number of physical blocks of the rewritable non-volatile memory module, and the number of physical pages in each physical block, etc.

Physical blocks logically belonging to the replacement area 508 are used in a bad block replacement procedure for replacing damaged physical blocks. To be specific, if there are still normal physical blocks in the replacement area 508 and a physical block in the data area 502 is damaged, the memory management circuit 202 selects a normal physical block from the replacement area 508 to replace the damaged physical block.

During the operation of the memory storage apparatus 100, the physical blocks grouped into the data area 502, the spare area 504, the system area 506, and the replacement area 508 are dynamically changed. For example, physical blocks alternatively used for storing data are dynamically associated with the data area 502 or the spare area 504.

It should be mentioned that in the present exemplary embodiment, the memory management circuit 202 manages the rewritable non-volatile memory module 106 in unit of each physical block. However, the present invention is not limited thereto, and in another exemplary embodiment, the memory management circuit 202 may also group the physical blocks into a plurality of physical units and manages the rewritable non-volatile memory module 106 in unit of each physical unit. Each physical unit may be composed of a plurality of physical blocks belonging to the same sub memory module or different sub memory modules.

Referring to FIG. 4B, the memory management circuit 202 configures logical blocks 610(0)-610(H) to be mapped to the physical blocks in the data area 502, wherein each of the logical blocks has a plurality of logical pages, and the logical pages are sequentially mapped to the physical pages in the corresponding data physical block. For example, when the memory storage apparatus 100 is formatted, the logical blocks 610(0)-610(H) are initially mapped to the physical blocks 410(0)-410(F-1) in the data area 502.

In the present exemplary embodiment, the memory management circuit 202 maintains a logical block-physical block mapping table to record the mapping relationship between the logical blocks 610(0)-610(H) and the physical blocks in the data area 502. In addition, because the host system 1000 accesses data in unit of logical access address (for example, sector), when the host system 1000 accesses data, the memory management circuit 202 converts the logical access addresses 710(0)-710(K) corresponding to the memory storage apparatus 100 into corresponding logical pages. For example, when the host system 1000 is about to access a specific logical access address, the memory management circuit 202 converts the logical access address to be accessed by the host system 1000 into a multi-dimensional address composed of the corresponding logical block and logical page and accesses data in the corresponding physical page according to the logical block-physical block mapping table.

In the present exemplary embodiment, after the memory storage apparatus 100 is powered on, the memory management circuit 202 configures an erase mark for each physical block in the spare area 504.

For example, when the memory storage apparatus 100 is enabled, the memory management circuit 202 executes related initialization operations to allow the memory storage apparatus 100 to enter a standby state in which the memory storage apparatus 100 can receive and process commands from the host system 1000. During this initialization operation execution period, the memory management circuit 202 establishes a spare physical block erase table (as the spare physical block erase table 600 illustrated in FIG. 5) to record the erase mark corresponding to each physical block of the spare area 504 and initially sets all the erase marks corresponding to the physical blocks of the spare area 504 to an unerased state.

Figure 5:
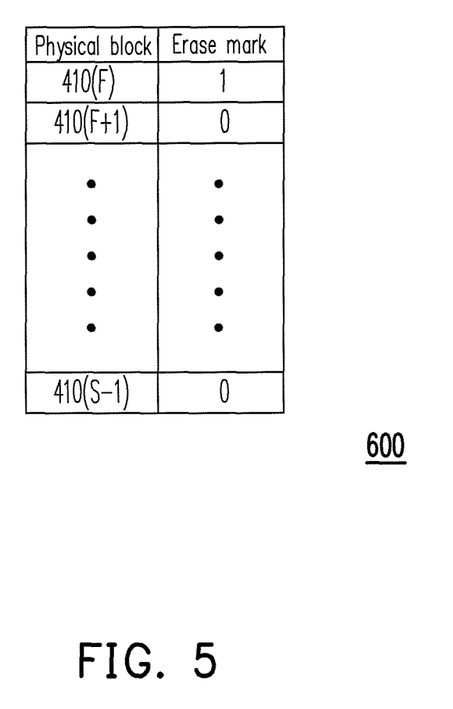
FIG. 5 illustrates an example of a spare physical block erase table according to the first exemplary embodiment of the present invention.

In particular, during the initialization period, the memory management circuit 202 does not execute an erase command on the physical blocks of the spare area 504, so that the time for the memory storage apparatus 100 to enter the standby state in which the memory storage apparatus 100 can receive and process commands from the host system 1000 can be shortened.

After the memory storage apparatus 100 enters the standby state in which the memory storage apparatus 100 can receive and process commands from the host system 1000, the memory management circuit 202 can access the rewritable non-volatile memory module 106 according to commands issued by the host system 1000. In particular, while writing data into a physical block selected from the spare area 504, the memory management circuit 202 determines whether the erase mark of the selected physical block is set to the unerased state. If the erase mark of the selected physical block is set to the unerased state, the memory management circuit 202 executes an erase command on this physical block and sets the erase mark corresponding to this physical block to an erased state before writing the data into this physical block.

Regarding each erase mark in the spare physical block erase table 600, "0" represents the unerased state and "1" represents the erased state. However, the present invention is not limited thereto. Additionally, in the present exemplary embodiment, the memory management circuit 202 stores the spare physical block erase table 600 in the buffer memory 252 and continuously updates the erase marks during the operation of the memory storage apparatus 100. Namely, every time when the memory storage apparatus 100 is powered on, the spare physical block erase table 600 is re-established, and during the operation of the memory storage apparatus 100, the memory management circuit 202 determines whether to execute the erase command on the physical blocks in the spare area 504 according to the erase marks. Accordingly, the memory storage apparatus 100 and the memory controller 104 thereof in the present exemplary embodiment can effectively shorten the time for entering the standby state when the memory storage apparatus 100 is powered on, can ensure that no incomplete data is stored in any physical block when a power failure occurs, and can avoid double programming.

Figure 6:
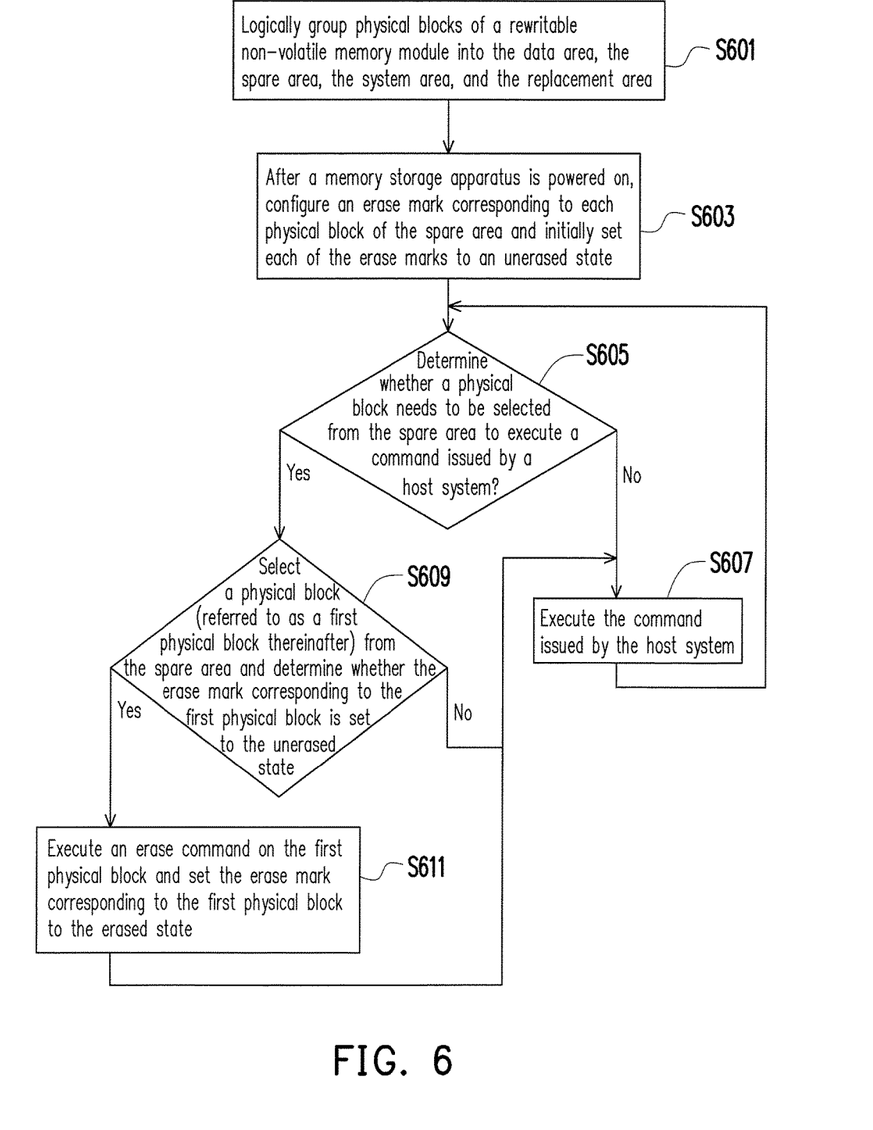
FIG. 6 is a flowchart of a memory erasing method according to the first exemplary embodiment of the present invention.

FIG. 6 is a flowchart of a memory erasing method according to the first exemplary embodiment of the present invention.

Referring to FIG. 6, in step S601, the memory management circuit 202 logically groups the physical blocks of the rewritable non-volatile memory module 106 into the data area 502, the spare area 504, the system area 506, and the replacement area 508. It should be understood that even though the physical blocks are logically grouped into the data area 502, the spare area 504, the system area 506, and the replacement area 508 in the present exemplary embodiment, in another exemplary embodiment of the present invention, the physical blocks may also be grouped into only the data area 502 and the spare area 504.

In step S603, after the memory storage apparatus 100 is powered on, the memory management circuit 202 configures an erase mark for each physical block belonging to the spare area 504 and initially sets each of the erase marks to an unerased state.

Next, in step S605, the memory management circuit 202 determines whether a physical block needs to be selected from the spare area 504 to execute a command issued by the host system 1000.

If no physical block is to be selected from the spare area 504, in step S607, the memory management circuit 202 executes the command issued by the host system 1000. After that, step S605 is executed.

If a physical block needs to be selected from the spare area 504, in step S609, the memory management circuit 202 selects a physical block (referred to as a first physical block thereinafter) from the spare area 504 and determines whether the erase mark corresponding to the first physical block is set to the unerased state.

If the erase mark corresponding to the first physical block is not set to the unerased state, step S607 is executed. If the erase mark corresponding to the first physical block is set to the unerased state, in step S611, the memory management circuit 202 executes an erase command on the first physical block and sets the erase mark corresponding to the first physical block to the erased state. After that, step S607 is executed.

Second Exemplary Embodiment

The only difference between the second exemplary embodiment and the first exemplary embodiment is that in the second exemplary embodiment, the memory controller 104 executes the erase command on the physical blocks of the spare area 504 when the host system 1000 has not issued any command for some time. Accordingly, the time for executing a write command can be effectively shortened and the performance of the memory storage apparatus 1000 can be improved. Below, the difference between the second exemplary embodiment and the first exemplary embodiment will be explained with reference to drawings of the first exemplary embodiment.

In the second exemplary embodiment, when the memory storage apparatus 100 enters a standby state and has not received any command from the host system 1000, the memory management circuit 202 starts to execute an erase command on the physical blocks belonging to the spare area 504 and sets the erase marks of the erased physical blocks to the erased state.

For example, the memory management circuit 202 includes a timer (not shown), and the timer starts counting every time when the memory storage apparatus 100 enters the standby state. If the memory storage apparatus 100 still does not receive any command from the host system 1000 when the timer reaches a predetermined time (for example, 3 seconds), the memory management circuit 202 selects physical blocks from the spare area 504 to execute the erase operation until it receives a command from the host system 1000. Namely, the memory management circuit 202 executes the erase command on the physical blocks belonging to the spare area 504 and sets the erase marks corresponding to the erased physical blocks to the erased state when it needs not to process any command issued by the host system 1000. If the memory storage apparatus 100 receives a command from the host system 1000 before the timer reaches the predetermined time or during the memory management circuit 202 executes the erase command on the physical blocks belonging to the spare area 504, the memory management circuit 202 executes the received command and resets the timer (for example, sets the timer to zero).

Figure 7:
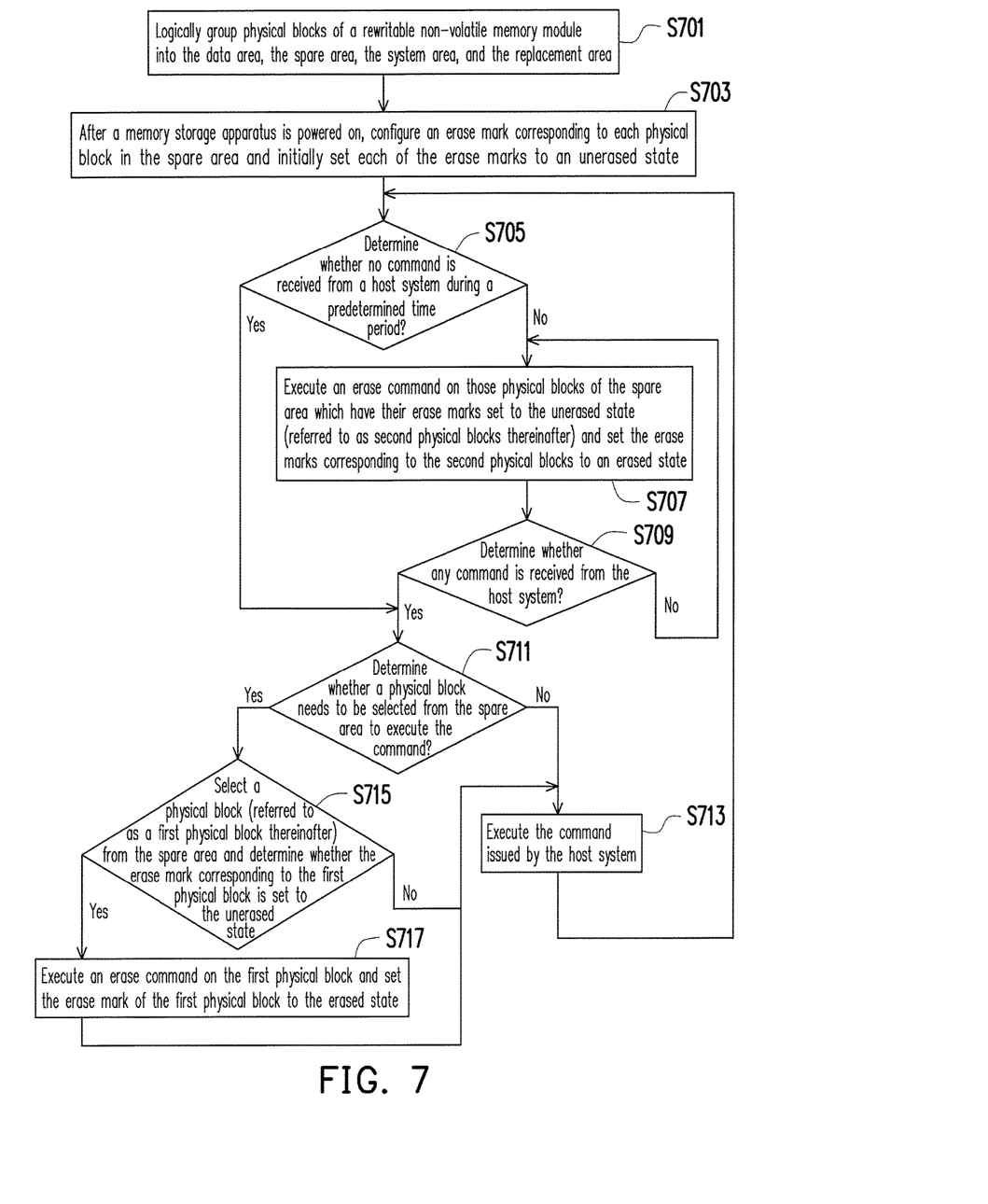
FIG. 7 is a flowchart of a memory erasing method according to a second exemplary embodiment of the present invention.

FIG. 7 is a flowchart of a memory erasing method according to the second exemplary embodiment of the invention.

Referring to FIG. 7, in step S701, the memory management circuit 202 logically groups the physical blocks of the rewritable non-volatile memory module 106 into a data area 502, a spare area 504, a system area 506, and a replacement area 508. Even though the physical blocks are logically grouped into the data area 502, the spare area 504, the system area 506, and the replacement area 508 in the present exemplary embodiment, in another exemplary embodiment of the invention, the physical blocks may also be grouped into only the data area 502 and the spare area 504.

In step S703, after the memory storage apparatus 100 is powered on, the memory management circuit 202 configures an erase mark for each physical block belonging to the spare area 504 and initially sets each of the erase marks to the unerased state.

Next, in step S705, the memory management circuit 202 determines whether no command is received from the host system 1000 during a predetermined time period.

If no command is received from the host system 1000 during the predetermined time period, in step S707, the memory management circuit 202 executes an erase command on those physical blocks belonging to the spare area 504 which have their erase marks set to the unerased state (referred to as second physical blocks thereinafter) and sets the erase marks corresponding to the second physical blocks to the erased state.

Thereafter, in step S709, the memory management circuit 202 determines whether any command is received from the host system 1000.

If no command is received from the host system 1000, step S707 is executed. If a command is received from the host system 1000, in step S711, the memory management circuit 202 determines whether a physical block needs to be selected from the spare area 504 to execute the command.

If no physical block needs to be selected from the spare area 504, in step S713, the memory management circuit 202 executes the command issued by the host system 1000. After that, step S707 is executed. If a physical block needs to be selected from the spare area 504, in step S715, the memory management circuit 202 selects a physical block (referred to as a first physical block thereinafter) from the spare area 504 and determines whether the erase mark corresponding to the first physical block is set to the unerased state.

If the erase mark corresponding to the first physical block is not set to the unerased state, step S713 is executed. If the erase mark corresponding to the first physical block is set to the unerased state, in step S717, the memory management circuit 202 executes an erase command on the first physical block and sets the erase mark corresponding to the first physical block to the erased state. Thereafter, step S713 is executed.

If a command is received from the host system 1000 during the predetermined time period, step S711 is executed.

Third Exemplary Embodiment

The hardware structure of the third exemplary embodiment is similar to that of the first exemplary embodiment. Below, the third exemplary embodiment is described with reference to FIG. 1A, FIG. 2, FIG. 3, FIG. 4A, and FIG. 4B of the first exemplary embodiment.

In the present exemplary embodiment, the memory management circuit 202 of the memory controller 104 establishes a link list according to the physical blocks of the spare area 504 and uses the physical blocks belonging to the spare area 504 according to the link list.

Figure 8:
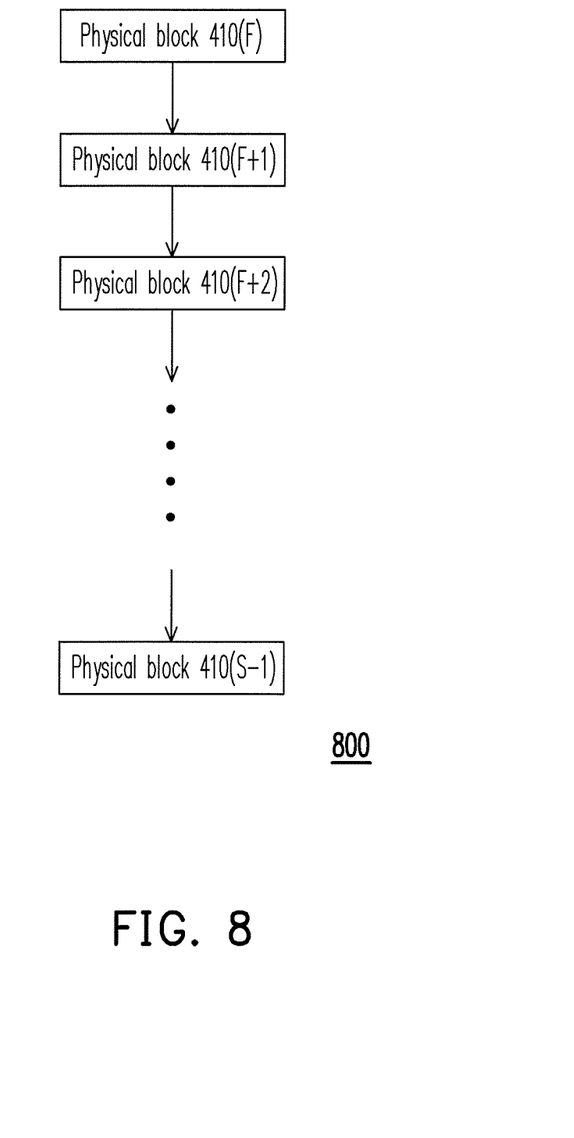
FIG. 8 illustrates an example of a link list according to a third exemplary embodiment of the present invention.

FIG. 8 illustrates an example of a link list according to the third exemplary embodiment of the present invention.

Referring to FIG. 8, when the memory storage apparatus 100 is initialized (for example, formatted), the memory management circuit 202 links the physical blocks 410(F)-410(S-1) of the spare area 504 according to an arrangement order. Herein none of the physical blocks recorded in the link list 800 records any data.

Subsequently, when a physical block needs to be selected from the spare area 504, the memory management circuit 202 selects the physical block according to the link list 800, wherein the physical block arranged at the beginning of the link list 800 is first selected. Besides, after data is written, the selected physical block is removed from the link list 800. Additionally, when a physical block (referred to as a fourth physical block thereinafter) containing invalid data is recycled into the spare area 504, the memory management circuit 202 executes an erase command on the fourth physical block and records the address of the fourth physical block at the end of the link list 800.

It should be mentioned that in the present exemplary embodiment, every time when the memory storage apparatus 100 is powered on, the memory management circuit 202 executes the erase command only on a predetermined number of physical blocks arranged at the beginning of the link list 800, so as to shorten the time for the memory storage apparatus 100 to enter the standby state.

To be specific, as described above, a write failure may be caused in the memory storage apparatus 100 due to a power failure, and the physical block being written may contain incomplete data. In the present exemplary embodiment, because the physical blocks in the spare area 504 are selected according to the link list 800, only a few physical blocks arranged at the beginning of the link list 800 may contain incomplete data. Accordingly, in the present exemplary embodiment, every time when the memory storage apparatus 100 is powered on, the memory management circuit 202 executes the erase command only on a few physical blocks arranged at the beginning of the link list 800, so as to avoid double programming.

In the present exemplary embodiment, the predetermined number is determined according to the number of physical blocks that can be simultaneously processed by the memory management circuit 202. Namely, when a power failure occurs, write errors may be produced in the physical blocks that are simultaneously processed and accordingly these physical blocks may contain incomplete data. For example, the predetermined number may be set to 6. However, the present invention is not limited thereto.

It should be mentioned that in the present exemplary embodiment, the link list 800 is stored in the rewritable non-volatile memory module 106 (for example, the system area 506). When the memory storage apparatus 100 is powered on, the memory management circuit 202 loads the link list 800 into the buffer memory 252 so that the link list 800 can be updated. Thereafter, when a power off signal is received, the memory management circuit 202 stores the link list 800 back into the rewritable non-volatile memory module 106.

Figure 9:
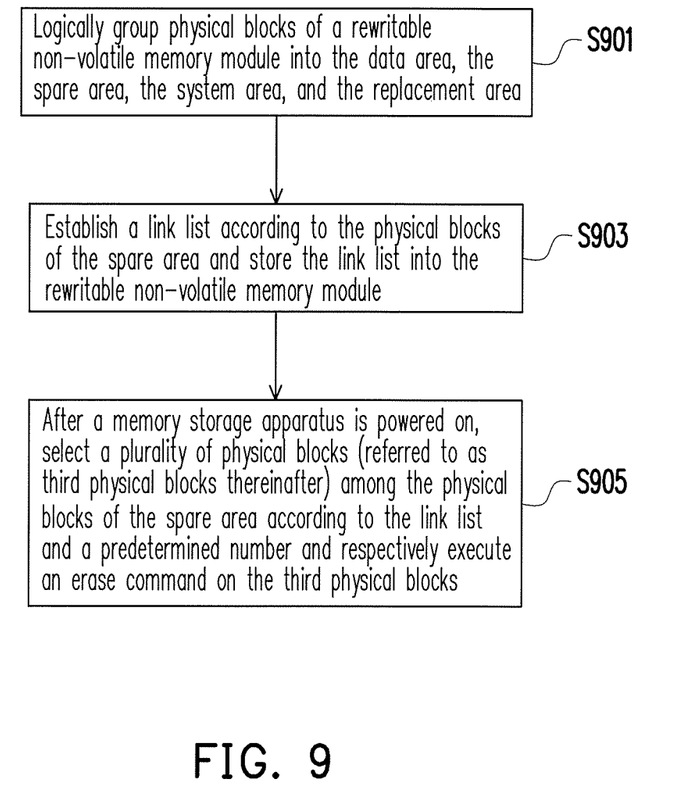
FIG. 9 is a flowchart of a memory erasing method according to the third exemplary embodiment of the present invention.

FIG. 9 is a flowchart of a memory erasing method according to the third exemplary embodiment of the present invention.

Referring to FIG. 9, in step S901, the memory management circuit 202 logically groups the physical blocks of the rewritable non-volatile memory module 106 into the data area 502, the spare area 504, the system area 506, and the replacement area 508. Even though the physical blocks are logically grouped into the data area 502, the spare area 504, the system area 506, and the replacement area 508 in the present exemplary embodiment, in another exemplary embodiment of the invention, the physical blocks may also be grouped into only the data area 502 and the spare area 504.

In step S903, the memory management circuit 202 establishes a link list 800 according to the physical blocks in the spare area 504 and stores the link list 800 into the rewritable non-volatile memory module 106.

In step S905, after the memory storage apparatus 100 is powered on, the memory management circuit 202 selects a plurality of physical blocks (referred to as third physical blocks thereinafter) among the physical blocks belonging to the spare area 504 according to the link list 800 and a predetermined number and respectively executes an erase command on the third physical blocks. Herein the number of the third physical blocks is equal to the predetermined number.

In summary, in the memory erasing method, the memory controller, and the memory storage apparatus described in foregoing exemplary embodiments, after the memory storage apparatus is powered on, the physical blocks belonging to the spare area are simply marked so that the time for the memory storage apparatus to enter the standby state is effectively shortened. In addition, in the memory erasing method, the memory controller, and the memory storage apparatus described in foregoing exemplary embodiments, after the memory storage apparatus is powered on, an erase command is executed on only a part of the physical blocks in the spare area, so that the time for the memory storage apparatus to enter the standby state is effectively shortened. Moreover, in the memory erasing method, the memory controller, and the memory storage apparatus described in foregoing exemplary embodiments, the problem of double programming can be effectively avoided. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A memory erasing method for a rewritable non-volatile memory module of a memory storage apparatus, wherein the rewritable non-volatile memory module has a plurality of physical blocks, the memory erasing method comprising:

logically grouping the physical blocks into at least a data area and a spare area;

establishing a link list according to the physical blocks of the spare area, and storing the link list into the rewritable non-volatile memory module, wherein the physical blocks of the spare area are recorded in the link list according to an arrangement order; and during every power on of the memory storage apparatus, selecting a plurality of third physical blocks among the physical blocks in the spare area according to the link list and a predetermined number, and respectively executing an erase command on the third physical blocks, wherein the third physical blocks are arranged at a beginning of the link list, and the number of the third physical blocks is the predetermined number.

2. The memory erasing method according to claim 1 further comprising:
when the physical blocks of the spare area are to be used, sequentially selecting the physical blocks of the spare area according to the link list.

3. The memory erasing method according to claim 1 further comprising:
when a fourth physical block among the physical blocks of the data area is associated with the spare area, executing the erase command on the fourth physical block, and recording the fourth physical block at an end of the link list.

4. A memory controller for controlling a rewritable non-volatile memory module of a memory storage apparatus, wherein the rewritable non-volatile memory module has a plurality of physical blocks, the memory controller comprising:
a host interface, configured to couple to a host system;
a memory interface, configured to couple to the rewritable non-volatile memory module;
a memory management circuit, coupled to the host interface and the memory interface, and configured to group the physical blocks into at least a data area and a spare area;
wherein the memory management circuit establishes a link list according to the physical blocks of the spare area and stores the link list into the rewritable non-volatile memory module, wherein the physical blocks of the spare area are recorded in the link list according to an arrangement order,
wherein during every power on of the memory storage apparatus, the memory management circuit selects a plurality of third physical blocks among the physical blocks of the spare area according to the link list and a predetermined number and respectively executes an erase command on the third physical blocks, wherein the third physical blocks are arranged at a beginning of the link list, and the number of the third physical blocks is the predetermined number.

5. The memory controller according to claim 4, wherein when the physical blocks of the spare area are to be used, the memory management circuit sequentially selects the physical blocks of the spare area according to the link list.

6. The memory controller according to claim 4, wherein when the memory management circuit associates a fourth physical block among the physical blocks of the data area with the spare area, the memory management circuit executes the erase command on the fourth physical block and records the fourth physical block at an end of the link list.

7. A memory storage apparatus, comprising:
a connector, configured to couple to a host system;
a rewritable non-volatile memory module, having a plurality of physical blocks; and
a memory controller, coupled to the rewritable non-volatile memory module, and configured to logically group the physical blocks into at least a data area and a spare area,
wherein the memory controller establishes a link list according to the physical blocks in the spare area and stores the link list into the rewritable non-volatile memory module, wherein the physical blocks of the spare area are recorded in the link list according to an arrangement order,
wherein during every power on of the memory storage apparatus, the memory controller selects a plurality of third physical blocks among the physical blocks in the spare area according to the link list and a predetermined number and respectively executes an erase command on the third physical blocks, wherein the third physical blocks are arranged at a beginning of the link list and the number of the third physical blocks is the predetermined number.

8. The memory storage apparatus according to claim 7, wherein when the physical blocks of the spare area are to be used, the memory controller sequentially selects the physical blocks of the spare area according to the link list.

9. The memory storage apparatus according to claim 7, wherein when a fourth physical block among the physical blocks of the data area is associated with the spare area, the memory controller executes the erase command on the fourth physical block and records the fourth physical block at an end of the link list.

* * * * *